(12) United States Patent
Karam

(10) Patent No.: US 7,368,839 B2
(45) Date of Patent: May 6, 2008

(54) SLIP RING END FRAME

(76) Inventor: Roy N. Karam, 506 Quance Avenue, Saskatoon (CA) SK S7H 3B4

( * ) Notice: Subject to any disclaimer, the term of this patent is extended or adjusted under 35 U.S.C. 154(b) by 270 days.

(21) Appl. No.: 11/354,179

(22) Filed: Feb. 15, 2006

(65) Prior Publication Data

US 2006/0131970 A1    Jun. 22, 2006

Related U.S. Application Data

(63) Continuation-in-part of application No. 10/724,199, filed on Dec. 1, 2003, now abandoned.

(51) Int. Cl.
*H02K 11/00* (2006.01)
(52) U.S. Cl. ...................... 310/68 D; 310/64
(58) Field of Classification Search ............. 310/68 D, 310/68 R, 62, 89, 91, 258
See application file for complete search history.

(56) References Cited

U.S. PATENT DOCUMENTS

| | | | |
|---|---|---|---|
| 3,609,428 A | 9/1971 | Cotton et al. | |
| 4,321,664 A | 3/1982 | Matthai | |
| 4,720,645 A | 1/1988 | Stroud | |
| 4,841,182 A * | 6/1989 | Tsuchiya et al. | 310/68 D |
| 5,451,823 A * | 9/1995 | Deverall et al. | 310/68 D |
| 5,473,208 A * | 12/1995 | Stihi | 310/68 D |
| 6,107,710 A * | 8/2000 | Gamboa | 310/67 R |
| 6,150,196 A | 11/2000 | Tanaka et al. | |
| 6,184,600 B1 | 2/2001 | Asao et al. | |
| 6,198,187 B1 | 3/2001 | Asao et al. | |
| 6,359,352 B2 | 3/2002 | Asao | |
| 6,476,527 B2 * | 11/2002 | Ballard et al. | 310/68 D |
| 6,552,908 B2 | 4/2003 | DeNardis | |
| 6,731,030 B2 * | 5/2004 | Keidar et al. | 310/68 D |
| 6,882,069 B1 * | 4/2005 | Kashihara et al. | 310/68 D |
| 7,023,113 B2 * | 4/2006 | Tajima et al. | 310/68 D |
| 7,067,947 B2 * | 6/2006 | Ihata et al. | 310/62 |
| 2003/0042808 A1 * | 3/2003 | Keidar et al. | 310/68 D |

* cited by examiner

*Primary Examiner*—Thanh Lam
(74) *Attorney, Agent, or Firm*—Richard C. Litman

(57) ABSTRACT

The slip ring end (SRE) frame is an SRE frame of popular small dimension designed to allow available larger rectifier assemblies having larger heat sinks to be fitted into the SRE frame, thus providing increased heat dissipation capability. Two flattened frame mounting bore wells are provided in an inner cylindrical side wall of the SRE so that larger rectifier assemblies of choice having increased current carrying capability can fit inside the SRE frame. Specially configured rectifier heat sink mounting holes are provided so that the larger rectifier assemblies may be properly and securely mounted in the SRE frame. Additionally, the small SRE frame features strategically placed ventilation apertures of larger dimension to permit greater air flow through the device, thus producing cooler alternator running temperatures and providing higher durability.

15 Claims, 5 Drawing Sheets

US 7,368,839 B2

SLIP RING END FRAME

CROSS-REFERENCE TO RELATED APPLICATION

This application is a continuation-in-part and claims the benefit of prior U.S. patent application Ser. No. 10/724,199 filed Dec. 1, 2003 now abandoned.

BACKGROUND OF THE INVENTION

1. Field of the Invention

The present invention relates to automotive and fixed alternators, and more specifically to a small slip ring end (SRE) frame to accommodate a heavy duty rectifier assembly.

2. Description of the Related Art

The current trend for better fuel economy and efficiency is leading to increased demand on automotive electrical systems. With the increased draw on the automotive electrical systems it becomes necessary to supply higher output alternators that can meet the additional electrical demand on the battery and higher loads experienced by the alternator.

High output popular small frame alternators on vehicles and machinery used in automotive, industrial, agricultural and marine industries have a high rate of failure due to higher operating temperatures typically caused by continuous higher charging rate, lack of heat dissipation through rectifier heat sinks and diodes, insufficient cooling, i.e., air exchange/air flow, through the alternator and associated components, and debris buildup that limits cooling air flow. Failures are often evidenced as "burnout", and are predominantly found in the rectifier assembly.

Larger SRE frames used in larger framed alternators generally accommodate a more robust rectifier assembly having larger heat sinks and employing an electronic technology known as "twinning" wherein a twin diode is placed in parallel with each of a positive side three phase rectifying diode.

Thus three positive side diodes, one for each phase, are twinned with 3 additional diodes, resulting in a total of 9 diodes, three for the three phases on the negative side and 6 for the three phases on the positive side. When adequately cooled, the 9 diode large heat sink rectifier increases current capacity and durability for a variety of applications while to a large degree, eliminating the aforementioned "burnout" problem.

Yet the small framed alternator remains in many applications in which there is not enough physical space to mount a larger framed alternator. For example, there are many vehicles and other machinery in operation today that use the popular high output small frame alternators. However there exist no small frame alternator SRE frames that can physically accommodate and adequately cool the aforementioned larger rectifier assemblies available in larger framed alternators.

Thus, a slip ring end frame to accommodate a heavy duty rectifier assembly solving the aforementioned problems is desired.

SUMMARY OF THE INVENTION

The slip ring end (SRE), frame is an SRE frame of popular small dimension designed to allow available larger rectifier assemblies having larger heat sinks to be fitted into the SRE frame, thus providing increased current carrying capability. Two flattened frame mounting bore wells are provided in an inner cylindrical side wall of the SRE frame so that larger rectifier assemblies of choice can fit inside the SRE frame. Specially configured rectifier heat sink mounting holes are provided so that the larger rectifier assemblies may be properly and securely mounted in the SRE frame.

Additionally, the SRE frame features strategically placed ventilation apertures of larger dimension to permit greater air flow through the device, thus producing cooler alternator running temperatures and providing higher durability.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
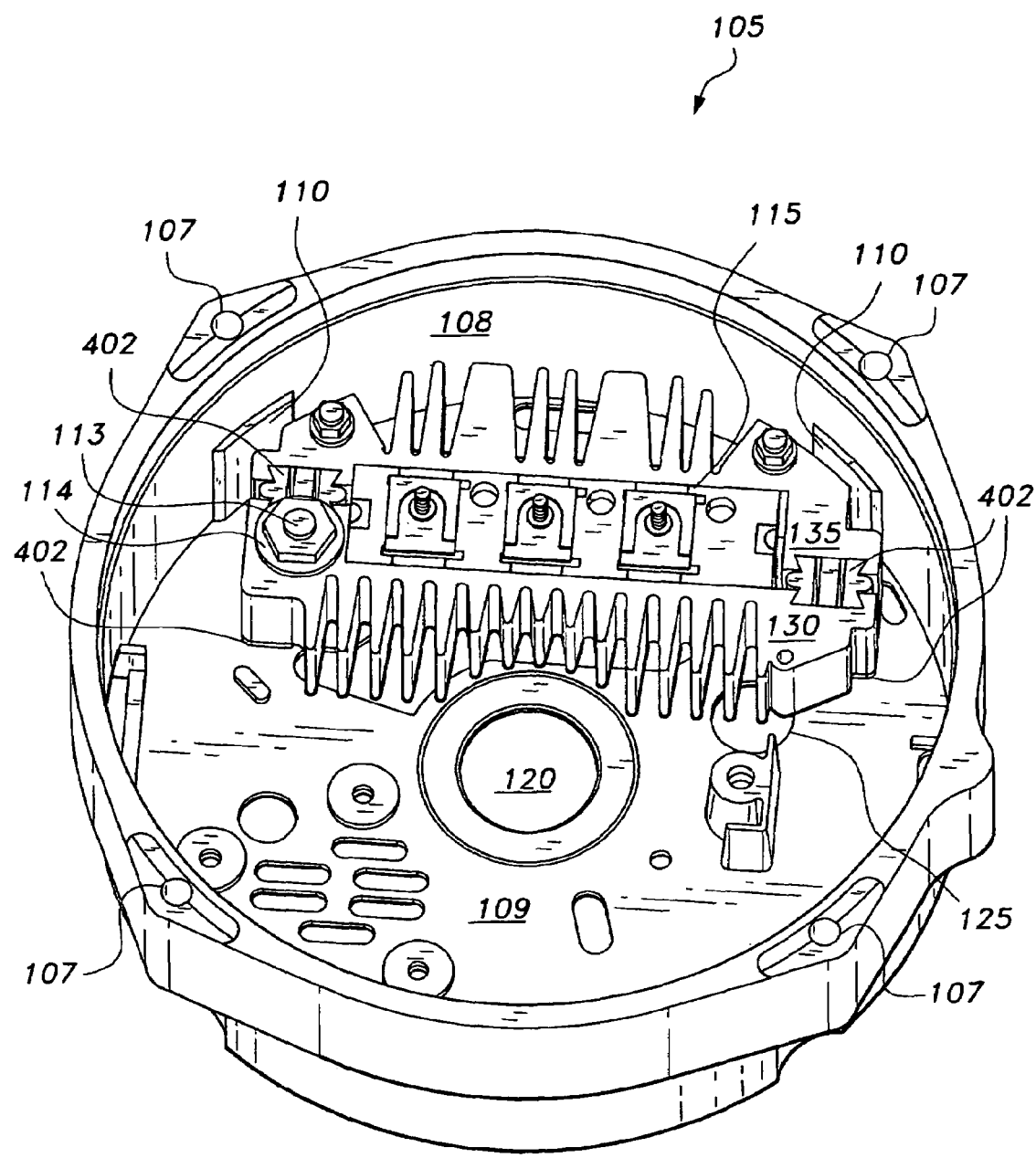
FIG. 1 is an environmental, perspective view of a small slip ring end frame, according to the present invention.
Figure 2:
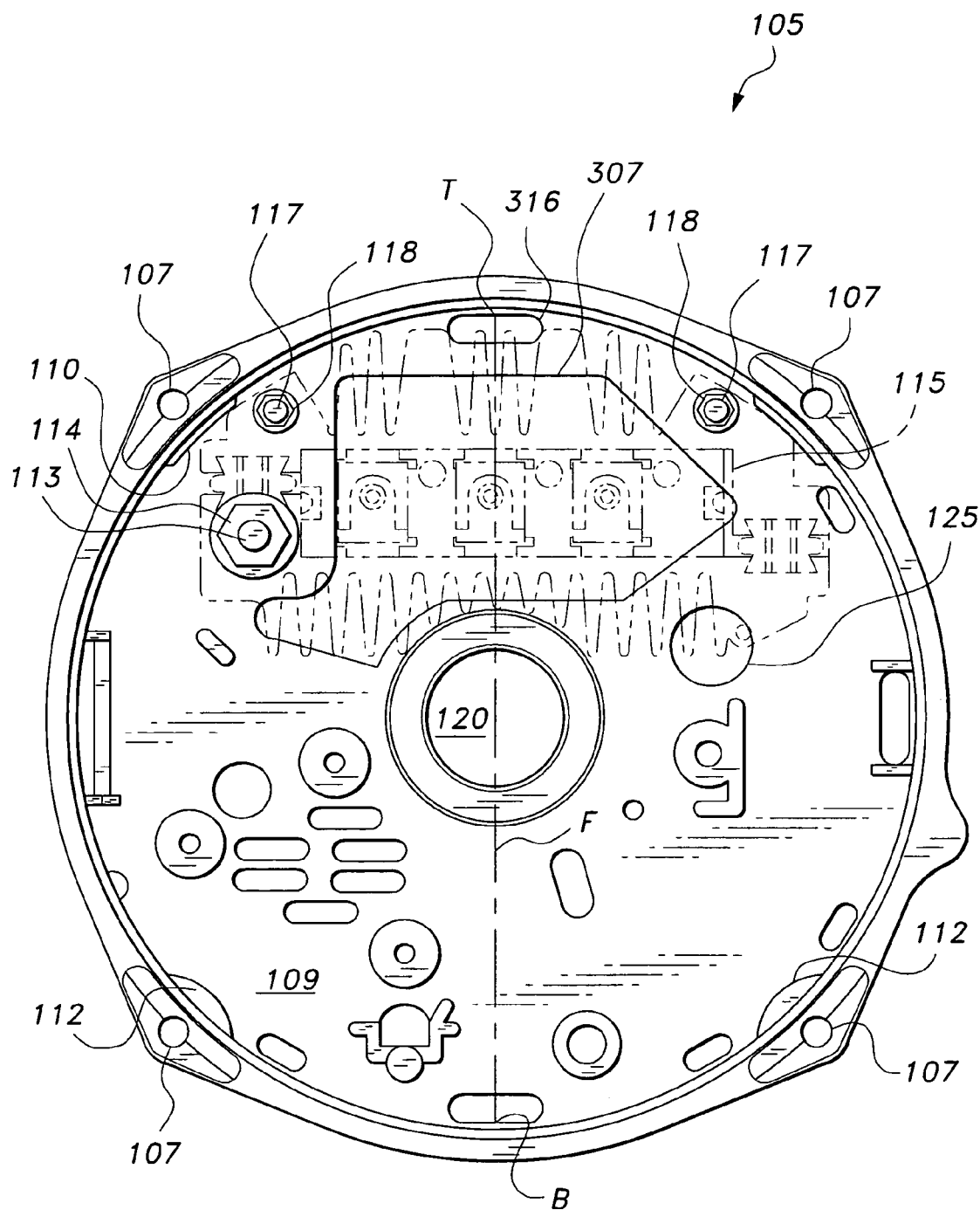
FIG. 2 is an inside top view of the small SRE frame, according to the present invention.

The present invention is, as shown in FIGS. 1 and 2, a slip ring end (SRE), frame 105 of popular small dimension designed to allow available larger rectifier assemblies having larger heat sinks and twinned, higher capacity diodes to be fitted into the SRE frame 105, thus providing increased current carrying capability.

Hereinafter, regarding discussion of inside frame features of SRE 105, as most clearly shown in FIG. 2, a frame of reference F is drawn so that inner diameter top dead center (ITDC) at 0° and inner diameter bottom dead center (IBDC) at 180° refer to a top end point and a bottom end point of a line drawn through radial center of rotor shaft guide bore 120 and terminating at top inner diameter circumferential edge point T and bottom inner diameter circumferential edge point B. Counterclockwise displacement from ITDC is expressed as negative degrees. Clockwise displacement from ITDC is expressed as positive degrees. Inner diameter, i.e., the line drawn between edge points T and B, on inner cylindrical sidewall 108 of SRE 105, according to the present invention, may range between approximately $5^{9/16}$ inches and approximately $5^{10/16}$ inches.

As shown in FIGS. 1 and 2, a first flattened frame mounting bore well 110 at approximately −45° and a second flattened frame mounting bore well 110 at approximately +45° are provided in an inner cylindrical side wall 108 of the SRE 105 so that larger rectifier assemblies of choice, such as large rectifier assembly 115, can fit inside the SRE frame 105. Mounting bore wells 110 may be flattened sufficiently to permit fit of rectifier assembly 115, yet be sufficiently convex to allow approximately 10 mm of clearance for proper entry and seating of mounting bolts, such as, for example, 10-24 by $2^{1/8th}$ inch mounting bolts, through bores 107 opposite the mounting bore wells 110.

Figure 3:
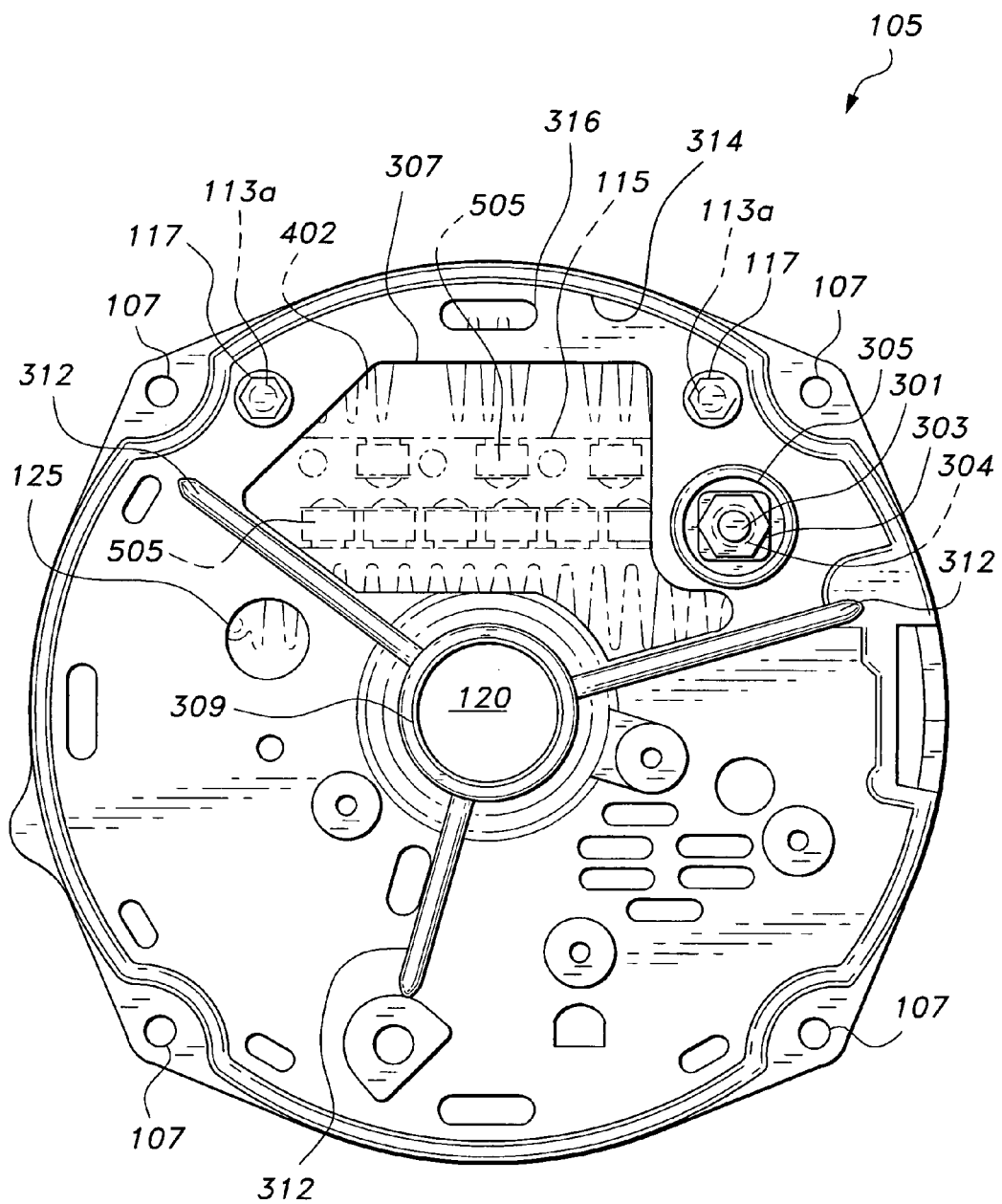
FIG. 3 is an outside top view of the small SRE frame, according to the present invention.

As shown in FIGS. 2 and 3, first and second rectifier heat sink mounting holes 113a are provided proximate to the inner circumference at approximately −32° and +32°, respectively, so that larger rectifier assembly 115 may be properly and securely mounted and grounded in the SRE frame 105 using threaded heat sink grounding bolt 117 in conjunction with correspondingly threaded heat sink grounding nut 118.

Figure 4:
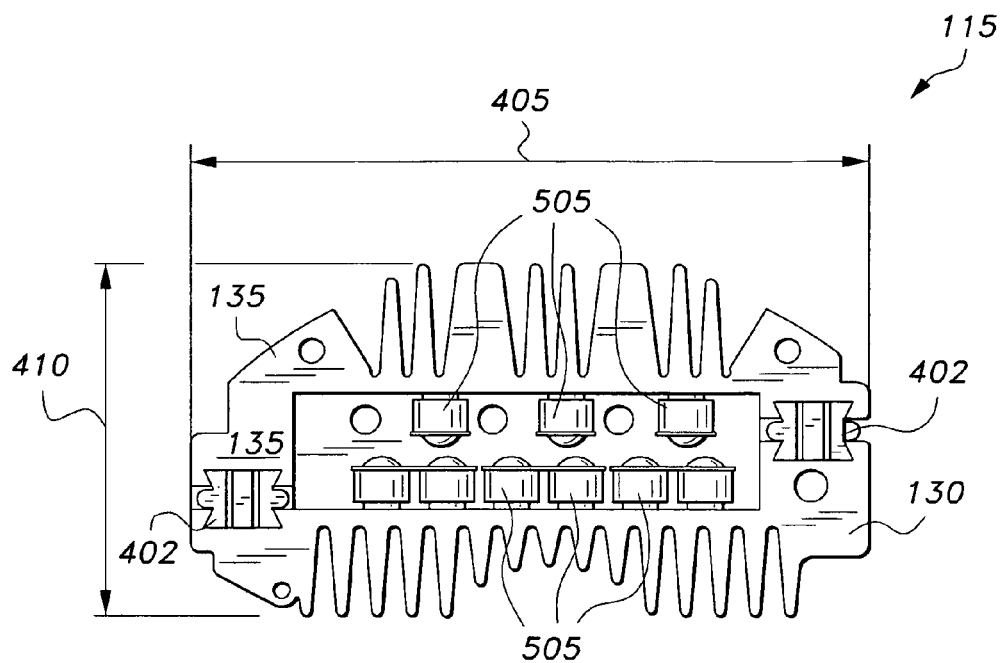
FIG. 4 is a top view of a heavy duty rectifier, according to the present invention.
Figure 5:
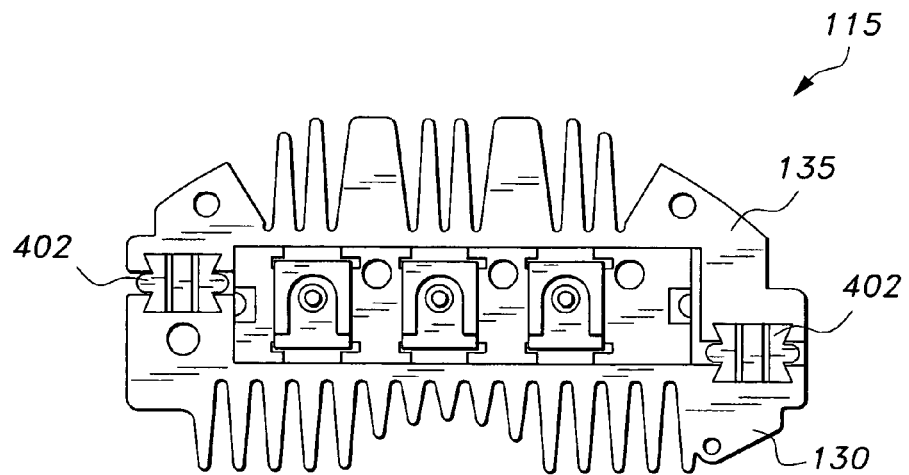
FIG. 5 is a bottom view of the heavy duty rectifier, according to the present invention.
Figure 6:
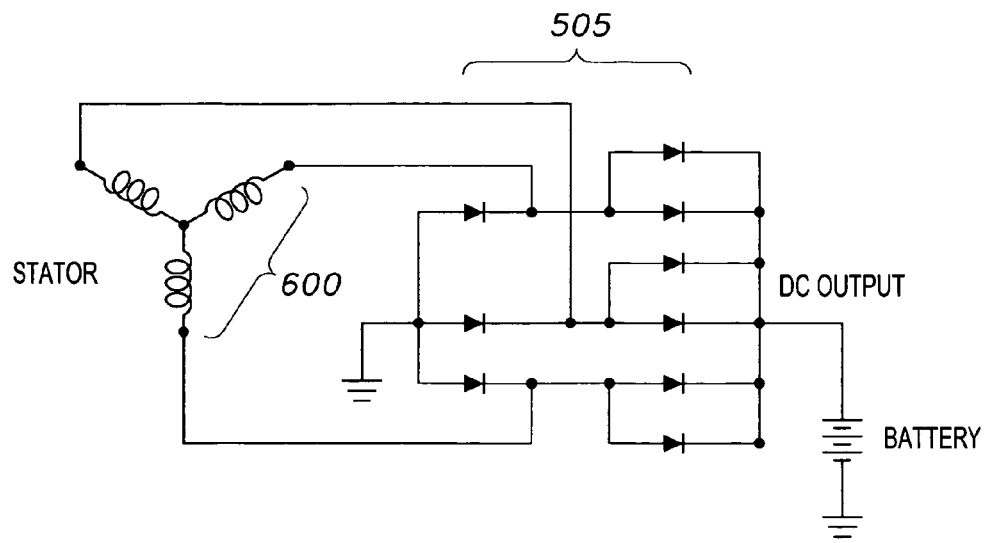
FIG. 6 is a schematic diagram of the diode configuration in a wye circuit, according to the present invention.
Figure 7:
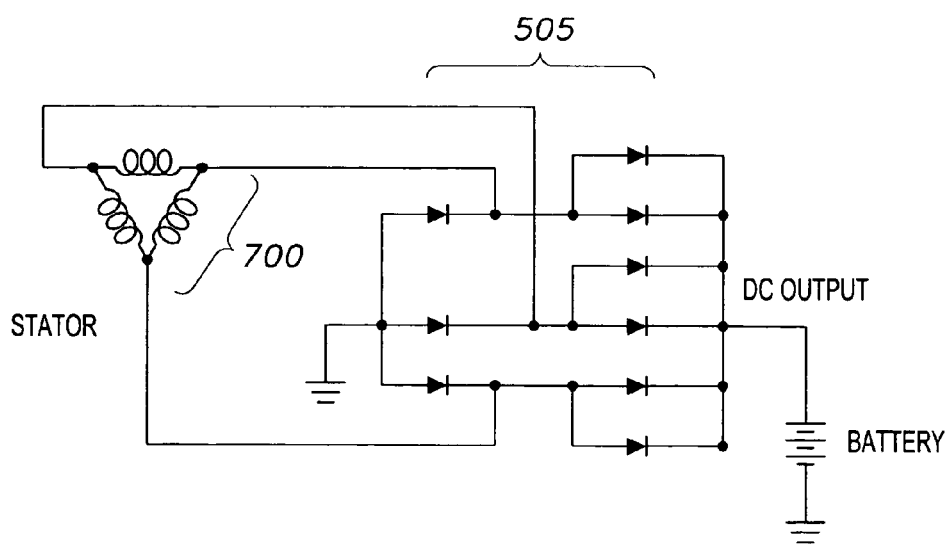
FIG. 7 is a schematic diagram of the diode configuration in a delta circuit, according to the present invention.

As shown in FIG. 4, larger rectifier assembly 115 has a length dimension 405 and a width dimension 410. A larger rectifier assembly length 405 of approximately 94 mm and a width dimension 410 of approximately 49 mm may be accommodated by the SRE 105. Additionally, larger rectifier assembly 115 comprises a positive heat sink 130, a negative heat sink 135, isolation insulation 402, and a minimum of 9 rectifier diodes 505 physically configured as shown in FIG. 3 and electrically configured as shown in either FIG. 6 or FIG. 7 depending on whether the alternator stator windings are wye configured 600 or delta configured 700.

Preferably the rectifier diodes 505 are "button" diodes rated at 50 amperes and 200 volts. Large rectifier assembly 115 having the positive heat sink 130 and negative heat sink 135 and preferred rectifier diodes 505 is generally available off the shelf from a variety of suppliers. By allowing proper and secure mounting of the larger rectifier assembly 115, the present invention advantageously provides better heat dissipation due to an increase exposed surface area of larger rectifier heat sinks such as positive heat sink 130 and negative heat sink 135. Heat sink mounting holes 113a provide proper grounding of the negative heat sink 135. Moreover, the higher capacity and twinned configuration of diodes 505 provides a reliable increase in current carrying capability of an alternator equipped with the SRE frame 105, according to the present invention.

Additionally, the small SRE frame 105 features strategically placed ventilation apertures of larger dimension, such as circular cooling bore 125, and uniquely shaped wide cooling aperture 307, to permit greater air flow through the device, while preventing debris buildup in the cooling apertures, thus producing cooler alternator running temperatures and providing higher durability. Circular cooling bore 125 is located approximately at +70° and displaced radially inward along an inside floor 109 of the SRE frame 105 so that a radial center of the cooling bore 125 lines up proximate to a lower right hand side of positive heat sink 130. The configuration of circular cooling bore 125, and, the configuration of wide cooling aperture 307 significantly expose larger rectifier assembly components such as, the diodes 505, positive heat sink 130, and negative heat sink 135 to cooler external air for better heat dissipation.

Hereinafter, regarding discussion of outside frame features of SRE 105, as most clearly shown in FIG. 3, along a surface opposing inside floor 109, a frame of reference is drawn so that inner diameter top dead center (ITDC) at 0° and inner diameter bottom dead center (IBDC) at 180° refer to a top end point and a bottom end point of a line drawn through radial center of rotor shaft guide bore 120 and terminating at top inner diameter circumferential edge T and bottom inner diameter circumferential edge B. Counterclockwise displacement from ITDC is expressed as negative degrees. Clockwise displacement from ITDC is expressed as positive degrees.

Rising from the surface opposing inside floor 109, and disposed around the periphery of rotor shaft guide bore 120 is a cylindrical bearing wall 309 having a predetermined thickness and a predetermined height. The bearing wall 309 is supported by a plurality of bearing wall support trusses 312, and as shown in FIG. 3, three support trusses are utilized. The bearing wall support trusses 312 are linear vertical walls having rounded top edges, and extend radially from the bearing wall 309.

Each bearing wall support truss 312 has a maximum height at the bearing wall 309 and a downward sloping gradient to a minimum height at a furthest point radially from the bearing wall 309. With respect to the aforementioned outside frame ITDC, a first of the support trusses 312 is disposed radially at a first angular displacement, preferably approximately 64°. A second of the support trusses 312 is disposed radially at a second angular displacement, preferably approximately −50°. A third of the support trusses 312 is disposed radially at a third angular displacement, preferably approximately −162°.

Battery post 301, battery post insulator 305, and battery post nut 303 are mounted in a battery post aperture 304 of the SRE frame 105 disposed through inside floor 109 and opposing surface at a fourth angular displacement, preferably approximately 45° and displaced radially inward approximately equidistant from first support truss 312 and inner diameter of outside circumferential wall 314.

Uniquely shaped wide cooling aperture 307 has preferably a perimeter comprising linear lines and circular arcs defined by vertical wall boundaries of the first and second support trusses 312, a clearance allowance for bearing wall 309, a clearance allowance for the battery post aperture 304, clearance allowances for first and second rectifier heat sink mounting holes 113a, and a clearance allowance for guide slot 316 proximate to ITDC. Thus a small slip ring end SRE frame 105 having a larger rectifier assembly 115 and capable of being integrated with additional off the shelf small frame, high output alternator components to provide a robust, durable and highly reliable alternator has been described.

It is to be understood that the present invention is not limited to the embodiment described above, but encompasses any and all embodiments within the scope of the following claims.

I claim:

1. A slip ring end frame, comprising:
   an inner cylindrical side wall disposed vertically from an inside floor;
   the inside floor having a rotor shaft guide bore disposed around an axial center of the SRE frame;
   the inner cylindrical side wall having a top inner diameter circumferential edge point defining an inside frame ITDC at an angle of 0° along a circumference of the SRE frame and a bottom inner diameter circumferential edge point defining an inside frame IBDC at an angle of 180° along a circumference of the SRE frame, the edge points being disposed at opposing ends of a line traveling between them and through a radial center of the rotor shaft guide bore;
   a first flattened frame mounting bore well disposed on the inner cylindrical side wall at approximately −45° from the inside frame ITDC;
   a second flattened frame mounting bore well disposed on the inner cylindrical side wall at approximately +45° from the inside frame ITDC;
   a first rectifier heat sink mounting hole disposed on the inside floor proximate to the inner cylindrical side wall at approximately −32° from the inside frame ITDC;
   a second rectifier heat sink mounting hole disposed on the inside floor proximate to the inner cylindrical side wall at approximately +32° from the inside frame ITDC;

a circular cooling bore disposed on the inside floor at approximately +70° from the inside frame ITDC and displaced radially inward along the inside floor so that a radial center of the cooling bore lines up proximate to a lower right hand side of a positive heat sink on a rectifier assembly when the rectifier assembly is mounted in the SRE frame;

a cylindrical bearing wall rising from a surface opposing the inside floor, and disposed around the periphery of the rotor shaft guide bore;

the bearing wall having a plurality of bearing wall support trusses extending radially from the bearing wall;

a first of the support trusses has a first radial disposition at a first angular displacement from an outside frame ITDC;

a second of the support trusses has a second radial disposition at a second angular displacement from the outside frame ITDC;

a third of the support trusses has a third radial disposition at a third angular displacement from the outside frame ITDC;

a battery post aperture is disposed on the surface opposing the inside floor at a fourth angular displacement from the outside frame ITDC, and is displaced radially inward approximately equidistant from the first support truss and an inner diameter of an outside circumferential wall;

a wide cooling aperture having a perimeter defined by vertical wall boundaries of the first and second support trusses;

the wide cooling aperture perimeter also being defined by a clearance allowance for the bearing wall, a clearance allowance for the battery post aperture, clearance allowances for the first and second rectifier heat sink mounting holes, and a clearance allowance for a guide slot proximate to the ITDC; and, wherein the SRE frame is capable of being integrated with additional off the shelf small frame high output alternator components to provide a robust, durable and highly reliable alternator.

2. The slip ring end frame according to claim 1, further comprising:

the rectifier assembly being mounted in position over the rectifier heat sink mounting holes, the battery terminal aperture, and between the first and second flattened frame mounting bores.

3. The slip ring end frame according to claim 2, further comprising:

the rectifier assembly being properly and securely mounted in the SRE frame with heat sink grounding bolts being disposed through the heat sink grounding holes, the heat sink grounding bolts being threaded to accept the heat sink grounding nuts; additional mounting of the rectifier assembly being provided by the combination of a threaded battery post disposed in the battery terminal aperture and a correspondingly threaded battery post nut.

4. The slip ring end frame according to claim 1, wherein the rectifier assembly includes a minimum of nine diodes.

5. The slip ring end frame according to claim 4, wherein the nine diodes are rated at 50 amperes and 200 volts to provide a reliable increase in current carrying capability of an alternator equipped with the SRE frame.

6. The slip ring end frame according to claim 4, wherein the nine diodes are button diodes.

7. The slip ring end frame according to claim 1, wherein the first angular displacement of the first of the support trusses is approximately 64° from the outside frame ITDC.

8. The slip ring end frame according to claim 1, wherein the second angular displacement of the second of the support trusses is approximately −50° from the outside frame ITDC.

9. The slip ring end frame according to claim 1, wherein the third angular displacement of the third of the support trusses is approximately −162° from the outside frame ITDC.

10. The slip ring end frame according to claim 1, wherein the fourth angular displacement of the battery post aperture is approximately 45° from the outside frame ITDC.

11. The slip ring end frame according to claim 1, wherein each of the flattened mounting bore wells has sufficient convexity to allow approximately 10 mm of clearance for proper seating of mounting bolts through bores 107, opposite the mounting bore wells.

12. The slip ring end frame according to claim 1, wherein the inner diameter of the cylindrical sidewalls may range between approximately $5^{9/16}$ inches and approximately $5^{10/16}$ inches.

13. The slip ring end frame according to claim 1, further comprising:

a length of the rectifier assembly not exceeding approximately 94 mm;

a width of the rectifier assembly not exceeding approximately 49 mm; and, wherein the width and length of the rectifier assembly may be accommodated by the SRE frame.

14. The slip ring end frame according to claim 1, wherein a configuration of the circular cooling bore significantly exposes larger rectifier assembly components to cooler external air for better heat dissipation.

15. The slip ring end frame according to claim 1, wherein a configuration of the wide cooling aperture significantly exposes larger rectifier assembly components to cooler external air for better heat dissipation.

* * * * *